(12) United States Patent
Levin et al.

(10) Patent No.: US 7,243,157 B2
(45) Date of Patent: Jul. 10, 2007

(54) DYNAMIC PROTOCOL CONSTRUCTION

(75) Inventors: David Levin, Redmond, WA (US);
Erik B. Christensen, Seattle, WA (US);
Saurab Nog, Sammamish, WA (US);
Donald F. Box, Bellevue, WA (US);
Christopher G. Kaler, Sammamish, WA (US); Giovanni M. Della-Libera, Seattle, WA (US); Alfred Lee, IV, Seattle, WA (US); David Wortendyke, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 442 days.

(21) Appl. No.: 10/783,751

(22) Filed: Feb. 20, 2004

(65) Prior Publication Data

US 2005/0198098 A1   Sep. 8, 2005

(51) Int. Cl.
*G06F 15/173* (2006.01)
(52) U.S. Cl. .................... 709/233; 709/228; 709/230; 709/246
(58) Field of Classification Search ................ None
See application file for complete search history.

(56) References Cited

U.S. PATENT DOCUMENTS

| | | | |
|---|---|---|---|
| 5,224,098 A | 6/1993 | Bird et al. | |
| 5,425,028 A | 6/1995 | Britton et al. | |
| 5,530,832 A | 6/1996 | So et al. | |
| 5,764,887 A | 6/1998 | Kells et al. | |
| 5,894,557 A | 4/1999 | Bade et al. | |
| 5,941,947 A | 8/1999 | Brown et al. | |
| 5,987,517 A | 11/1999 | Firth et al. | |
| 6,243,759 B1 | 6/2001 | Boden et al. | |
| 6,338,117 B1 | 1/2002 | Challenger et al. | |
| 6,430,576 B1 | 8/2002 | Gates et al. | |
| 6,519,636 B2 | 2/2003 | Engel et al. | |
| 6,519,764 B1 | 2/2003 | Atkinson et al. | |
| 6,598,121 B2 | 7/2003 | Challenger et al. | |
| 6,643,684 B1 | 11/2003 | Malkin et al. | |
| 6,662,235 B1 | 12/2003 | Challis et al. | |
| 6,694,368 B1 * | 2/2004 | An et al. | 709/227 |
| 7,000,006 B1 * | 2/2006 | Chen | 709/218 |

OTHER PUBLICATIONS

Hypertext Transfer Protocol—HTTP/1.1; World Wide Web Consortium (W3C); http://www.w3.org/Protocols/rfc2626/rfc2616-sec12.html; Chapter 12, pp. 46-47, no date avail.
Bauer, Lujo, et al.; "A General and Flexible Access-Control System for the Web"; Copyright 2002 by the USENIX Association; San Francisco, California; Aug. 5-9, 2002; 17 pages.
Verma, Dinesh C. et al.; "Policy-Based Management of Content Distribution Networks"; IEEE Network, The Magazine of Global Internetworking; Mar./Apr. 2002; vol. 16, No. 2, pp. 34-39.

\* cited by examiner

*Primary Examiner*—Duy-Vu N. Deo
(74) *Attorney, Agent, or Firm*—Lee & Hayes, PLLC

(57) ABSTRACT

A method includes advertising a policy characterizing communication properties supported by a node. The policy may be distributed to another node in response to a request for the policy. Policy expressions in the policy include one or more assertions that may be grouped and related to each other in a plurality of ways. A system includes a policy generator for generating at least one policy characterizing properties of a node. A policy retriever retrieves a policy from another node and a message generator generates a message to the other node, wherein the message conforms to the policy from the other node.

20 Claims, 5 Drawing Sheets

```
<wsp:Policy xmlns:wsse="..." xmlns:wssx="...">
  <wsp:ExactlyOne>                                              ⎯⎯ 202
    <wsp:All wsp:Usage="wsp:Required" wsp:Preference="100">     ⎯⎯ 208
      ⎡ <wsse:SecurityToken>
      ⎢   <wsse:TokenType>wsse:Kerberosv5TGT</wsse:TokenType>
  204 ⎢ </wsse:SecurityToken>
      ⎣ <wssx:Privacy />
    </wsp:All>                                                  ⎯⎯ 208
    <wsp:All wsp:Preference="1" wsp:Usage="wsp:Required">       ⎯⎯ 210
      ⎡ <wsse:SecurityToken>
      ⎢   <wsse:TokenType>wsse:UsernameToken</wsse:TokenType>
      ⎢ </wsse:SecurityToken>
      ⎢ <wsse:Integrity>
  206 ⎢   <wsse:Algorithm Type="wsse:AlgEncryption"
      ⎢     URI="http://www.w3.org/2001/04/xmlenc#3des-cbc" />
      ⎢ </wsse:Integrity>
      ⎣ <wssx:Audit />
    </wsp:All>                                                  ⎯⎯ 210
  </wsp:ExactlyOne>                                             ⎯⎯ 202
</wsp:Policy>
```

*Fig. 2*

DYNAMIC PROTOCOL CONSTRUCTION

RELATED APPLICATIONS

This patent application is related to co-owned U.S. patent application Ser. No. 10/783,776, entitled "Invalid Policy Detection," and U.S. patent application Ser. No. 10/783,554 entitled "Policy Application Across Multiple Nodes," both of which are hereby incorporated by reference for all that they disclose.

TECHNICAL FIELD

The described subject matter relates to electronic computing, and more particularly to systems and methods for dynamic protocol construction.

BACKGROUND

Communication between various computing devices (e.g., personal computers, server computers, mobile devices) is increasingly commonplace in a number of network environments, such as, e.g., the Internet and corporate intranets to name only a few examples. Often, these computing devices are configured for communication in accordance with preferred or even required protocols. Traditionally when a computing device attempts to engage in communication with another computing device using an unrecognized protocol, an error message is sent to the first device, and further communication typically cannot proceed.

As an illustration, a commercial web site may require a user's computer to comply with a particular protocol or data format before the user is granted access to the payment web pages. For example, the commercial website may require that incoming messages be encoded according to a particular encryption scheme for security purposes, or that incoming messages be formatted using a particular compression scheme to facilitate efficient transaction processing. If the user's computer is not equipped to abide by the specified protocol or data format, the user's computer generally receives an error notification, such as a "400" error code defined in the Hypertext Transport Protocol (HTTP). Typically, such error notifications are not very informative or helpful for a user to remedy the error, if possible, and continue communicating with the commercial website.

In addition, over time, as new protocols and data formatting techniques emerge, not all computing devices will necessarily have adopted the latest protocols and data formatting techniques. Thus, there will typically always be some differences between the protocols and/or data formats used by some computing devices and the protocols and/or data formats used by other computing devices. However, although some computing devices may not be able to apply the newest protocols or data formats, they typically can communicate using some other protocols or data formats. Unfortunately, a traditional computing device does not typically have the ability to identify the different protocols and/or data formats used by another computing device, and adapt, if possible, to the different protocols and/or data formats.

SUMMARY

Implementations are described and claimed herein to dynamically construct a protocol to facilitate communication between nodes. Implementations utilize policies associated with nodes to specify protocol properties of the nodes. A policy expression in a policy related to a node can be selected by another node to construct a protocol between the two nodes.

In some implementations, articles of manufacture are provided as computer program products. One implementation of a computer program product provides a computer program storage medium readable by a computer system and encoding a computer program for dynamic protocol construction. Another implementation of a computer program product may be provided in a computer data signal embodied in a carrier wave by a computing system and encoding the computer program for dynamic protocol construction.

The computer program product encodes a computer program for executing on a computer system a computer process that generates a message conforming to a group of assertions, the group of assertions characterizing capabilities or requirements of a first node. The process may further include sending a request to the first node for a policy including the group of assertions. Alternatively, the process may further include retrieving the group of assertions from a second node. The process may further include determining whether the group of assertions related to the first node is compatible with a group of assertions related to a second node.

In another implementation, a method includes advertising a policy having assertions characterizing communication properties of a destination node, each assertion specifying a communication property supported by the destination node. Advertising can include generating a message including the policy in response to a request for the policy. Advertising may also include incrementally distributing the policy.

In yet another implementation, a system is provided including a policy generator for generating at least one policy having assertions characterizing properties of a node. The system may include a policy retriever retrieving a policy from another node and a message generator generating a message to the other node, wherein the message conforms to a group of assertions in the policy from the other node.

BRIEF DESCRIPTION OF THE DRAWINGS

FIG. 2 illustrates an exemplary policy including assertions that may be used to construct a protocol for communication between two nodes;

DETAILED DESCRIPTION

Overview

Briefly, dynamic protocol construction may be implemented to facilitate communication between two nodes. Because data communication protocols and formats can change, communication between two nodes can be seriously hampered by mismatches in the protocols and formats employed by each of the nodes. The dynamic protocol construction scheme described herein allows a node to generate a policy having statements (referred to as assertions) that characterize properties of the node. The properties can relate to, for example, capabilities and/or requirements of the node. Another node that attempts to communicate with the first node can retrieve the policy and generate messages that conform to the assertions given therein and thereby successfully communicate with the node.

Exemplary System

Figure 1:
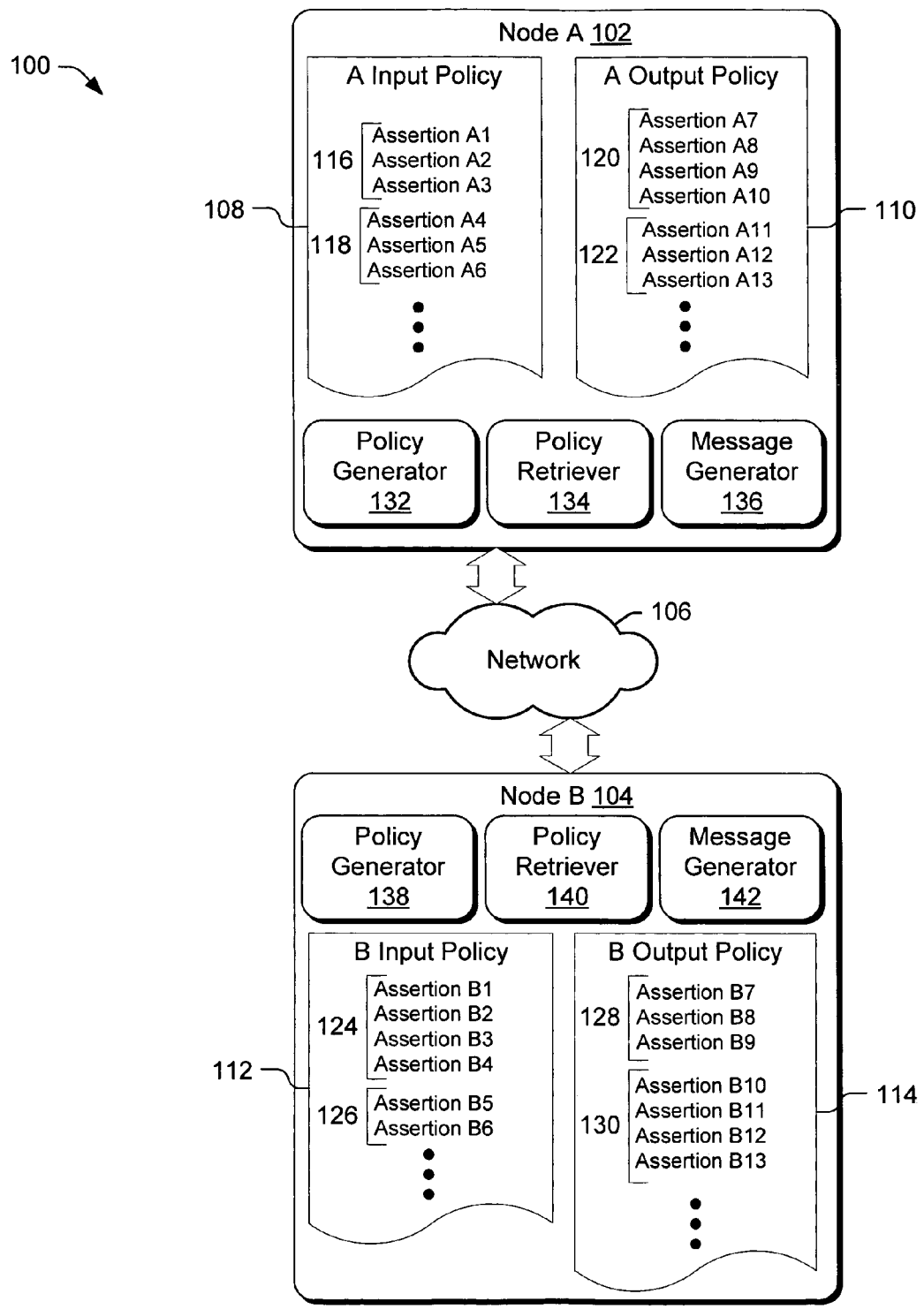
FIG. 1 illustrates an exemplary operating environment in which dynamic protocol construction can be carried out.

FIG. 1 illustrates an exemplary operating environment 100 in which dynamic protocol construction can be carried out. Two nodes, node A 102 and node B 104, communicate with each other via a network 106. Node A 102 and node B 104 may be arranged in any number of configurations. Typical configurations are a client/server configuration or a peer-to-peer configuration. The network 106 may include other intermediate nodes (not shown), through which data pass during communication between node A 102 and node B. As such, exemplary communication configurations can include 1 to N (i.e., single node to multiple node) and N to N (i.e., multiple node to multiple node) arrangements.

In general, a node is a processing location in a computer network. More particularly, in accordance with the various implementations described herein, a node is a process or device that is uniquely addressable via a network. By way of example, and not limitation, individually addressable computing devices, groups or clusters of computing devices that have a common addressable controller, addressable peripherals, such as addressable printers, and addressable switches and routers, as well as processes executing on such devices, are all examples of nodes.

The operating environment 100 supports many communication scenarios that are frequently carried out over a network. Exemplary scenarios include, but are not limited to, node A 102 accessing a resource from node B 104, or node A 102 providing a service to node B 104. For example, a user of node B 104 may access a commercial Web site at node A 102 to buy books from the Web site.

In the exemplary operating environment 100, data communication between node A 102 and node B 104 is carried out by exchanging messages between node A 102 and node B 104. When in a message exchange, node A 102 and node B 104 are designed to receive and/or transmit messages according to certain data formats and/or follow certain protocols. Node A 102 and node B 104 each have policies that may be used to express the data formats and protocols that can or should be used during message exchange.

More generally, a policy is an informal abstraction expressing properties of a node. In the implementation of FIG. 1, a policy expression includes one or more policy assertions (also referred to as 'assertions'). An assertion represents an individual preference, requirement, capability, or other property that a node (e.g., Node A 102) may, or in some circumstances, must comply with in order to communicate with another node (e.g., Node B 104).

For example, node A 102 includes an A input policy 108 and an A output policy 110. The A input policy 108 expresses one or more assertions related to messages that are received by, or input to, node A. The A output policy 110 expresses one or more assertions related to messages that are transmitted, or output by, node A. Similarly, node B 104 includes B input policy 112 and B output policy 114.

As shown in FIG. 1, the policies are illustrated as being implemented in one or more documents; however, policies need not be stored in documents, but rather, can be implemented in other forms, such as, stored in memory, dynamically created or retrieved from another node, or otherwise. A policy may be expressed in a markup language, such as, but not limited to, Hypertext Markup Language (HTML) and Extensible Markup Language (XML). In addition, an input policy and an output policy may be combined into a single policy.

To further illustrate the concept of a policy, a policy can specify message encoding formats, security algorithms, tokens, transport addresses, transaction semantics, routing requirements, and other properties related to message transmission or reception. Implementations of policies described herein specify one or more assertions, which can aid two nodes in a message exchange in determining if their requirements and capabilities are compatible. The assertions may be grouped and related to each other in some way. A group of one or more assertions may be referred to as a policy expression.

Accordingly, A input policy 108 includes a number of groups of input assertions, including a first policy expression 116 and a second policy expression 118. Similarly, A output policy 110 includes a number of groups of output assertions, including a first policy expression 120 and a second policy expression 122. Likewise, B input policy 112 includes a number of groups of input assertions, including a first policy expression 124 and a second policy expression 126; and B output policy 114 includes a number of groups of output assertions, including a first policy expression 128 and a second policy expression 130.

Expression (1) shown below illustrates how the assertions in A input policy 108 can be related in a Boolean manner:

$$\text{AInputPolicy: } (A1 \otimes A2 \otimes A3) \oplus (A4 \otimes A5 \otimes A6) \qquad (1)$$

Expression (1) indicates that in order to comply with the A input policy 108, a node attempting to send a message to node A can satisfy either assertion A1, assertion A2, and assertion A3 together, or assertion A4, assertion A5, and assertion A6 together, but typically not both groups of assertions. The manner in which a node, such as node B 104, may use the A input policy 108 to communicate with node A 102 is discussed further below. Other, non-Boolean, expressions can be used to express relationships among assertions.

The number of assertions shown in policy expressions 116, 118, 120, 122, 124, 126, 128, and 120 is purely exemplary for illustrative purposes only. The numbers assigned to the assertions shown in FIG. 1 (e.g., A1, A2, . . . , B13) are not intended to imply that the various assertions shown are different or the same. Indeed, frequently during operation, some assertions at node A 102 will match some assertions of node B 104, and some assertions at node A 102 will be different from some assertions at node B 104. A particular example of assertions is shown in FIG. 2, and is discussed further below.

Node A 102 includes a policy generator 132, a policy retriever 134, and a message generator 136. The policy generator 132 generates the A input policy 108 and the A output policy 110. The policy generator 132 can send either or both of the A input policy 108 and/or the A output policy 110 to node B 104 or other intermediate nodes in the network 106. One particular implementation of the policy generator 132 advertises the A input policy 108 and/or the A output policy 110, for example, by making A input policy 108 and/or the A output policy 110 publicly available either on node A 102 or some other node on the network 106.

The policy retriever 134 retrieves policies from other nodes, such as node B 104 or intermediate nodes on the network 106. The policy retriever 134 can request a policy from another node, receive the policy, and may cache a received policy in memory for later use. The policy retriever 134 can also retrieve a policy that was previously stored in local memory on node A 102. The policy retriever 134 performs functions related to determining whether a retrieved policy is compatible with a local policy and/or selecting a compatible policy expression in a retrieved policy.

The message generator 136 at node A 102 generates messages that conform to one or more assertions in the B input policy 112 of node B 104. For example, the message generator 136 may encrypt, format, or encode a message as specified by input assertions in the B input policy 112. As another example, the message generator 136 may transmit the message according to a compliant protocol (e.g., SOAP 1.1) specified in the B input policy 112. As yet another example, the message generator 136 may apply a user signature or password to the message in accordance with the B input policy 112. The output of the message generator 136 is a policy-compliant message complying with the B input policy 112.

Similarly, node B 104 includes a policy generator 138, a policy retriever 140, and a message generator 142. The policy generator 138 has functionality similar to that of the policy generator 132 in node A 102. Thus, if node A's 102 policy retriever 134 requests a policy from node B 104, node B's 104 policy generator 138 can responsively transmit one or more of the B input policy 114 and the B output policy 116 to the policy retriever 134 at node A 102.

The policy retriever 140 at node B 104 has functionality similar to the functionality described above with respect to policy retriever 134 at node A 102. The message generator 142 at node B 104 formats and transmits messages to node A 102 in accordance with one or more assertions in the input policy 108 of node A 102.

Node A 102 can retrieve and use a policy of node B 104 to construct a protocol with which to communicate to node B 104, and vice versa. This may involve a selection process where a node selects one group of assertions from the policy of the other node. For example, node B 104 retrieves (via the retriever 138) and analyzes the A input policy 108 to determine if node B can comply with at least one of the policy expressions, the first policy expression 116, the second policy expression 118, etc., in the A input policy 108. The determination may involve solving a relational equation such as expression (1) above. Other exemplary methods for determining whether node B 104 can comply is discussed below with respect to operations shown in FIG. 3.

Another implementation of the operating environment 100 includes a third party service or tool that compares policies of two or more nodes to determine whether they are compatible. Such a service or tool may operate on node A 102, node B 104, or an intermediate node on the network 106. Thus, a service may read B output policy 114 and read A input policy 108 and determine if the policies are compatible. For example, the service may determine that the policy expression 116 is compatible with the policy expression 128. The service can notify node A 102 and node B 104 as to the results of the compatibility determination.

FIG. 2 illustrates an exemplary policy 200 that may be used by a node to dynamically construct a protocol to facilitate communication with one or more other nodes. The exemplary policy 200 is in Extensible Markup Language (XML). As such, the exemplary policy 200 includes a number of tags, starting with an open bracket (<) and ending with a close bracket (/>).

As discussed above, a policy includes one or more assertions that can be grouped into one or more policy expressions. Grouping assertions can involve applying a relationship operator to the group. A relationship operator specifies a relationship between or among assertions in a group. Various other attributes, assertion types, and operators can be applied to an assertion. The exemplary policy 200 illustrates just a few exemplary attributes, assertion types, and operators. Other exemplary attributes, assertion types, and operators are discussed further below.

The exemplary policy 200 includes two policy expressions bounded by a <wsp:ExactlyOne> operator 202. A first policy expression 204 expresses a security profile (i.e., <wsse:SecurityToken>) consisting of security specific policy assertions. As shown in FIG. 2, the first policy expression 204 specifies "Kerberos Authentication" (i.e., <wsse:TokenType>wsse:Kerberosv5TGT (<wsse:TokenType>) and "Privacy" (i.e., <wssx:Privacy/>).

A second policy expression 206 specifies password authentication (<wsse:TokenType>wsse:UsernameToken</wsse:TokenType>), an integrity algorithm (i.e., <wsse:Algorithm Type="wsse:AlgEncryption" URI="http://www.w3.org/2001/04/xmlenc#3des-cbc"/>), and an audit trail (i.e., <wssx:Audit/>). The integrity algorithm specifies a particular encryption algorithm along with a Uniform Resource Identifier (URI) indicating a network location from which the encryption algorithm can be obtained.

The <wsp:ExactlyOne> operator 202 bounding the first policy expression 204 and the second policy expression 206 indicates that one and only one of the groups of assertions can be selected; i.e., the first policy expression 204 and the second policy expression 206 are alternatives.

Bounding the first policy expression 204 is an "All" operator 208. The All operator 208 indicates that all of the assertions in policy expression 204 must be practiced by a node if the policy expression 204 is selected. Similarly, the second policy expression 206 is bounded by another "All" operator 210, which indicates that all of the assertions in the second group 206 must be practiced if the second policy expression 206 is selected.

Each assertion may be associated with a usage type or attribute. The usage attribute stipulates how the assertion should be interpreted in relation to the overall policy. To illustrate, a privacy assertion could, for example, specify that privacy guarantees will be provided for information exchanged between two Web services, while an encryption assertion could specify a requirement for encryption. The privacy assertion and the encryption assertion differ, in that the privacy assertion has no externally visible manifestation, while the encryption assertion is externally manifested (i.e., the encryption assertion indicates a requirement on messages being sent to and from the Web services). The privacy assertion is simply a declaration that the Web services will guarantee some level of privacy to the sender, while the encryption assertion requires cooperation between the two Web services. Because usage can differ between assertions, a usage attribute can be used to characterize the difference. Various exemplary usage attributes are discussed below.

Accordingly, within the All operator 208 tag, and the All operator 210 tag, usage attributes indicate that the bounded assertions are "required". In an alternative implementation, each assertion tag bounded by the All operator 208, and the All operator 210, could individually specify the usage attribute.

Also in the All operator 208 tag, and the All operator 210 tag, preference values are shown that indicate a level of preference of the corresponding groups. In the exemplary policy 200, the preference value of the first policy expression 204 is "100", while the preference value for the second policy expression 206 is "1", meaning that the first policy expression 204 is preferred over the second policy expression 206.

To capture the nature of differences among various assertions, five exemplary usage attributes are used in one particular implementation of a policy: Required, Optional, Rejected, Observed and Ignored. These exemplary usage attributes are shown and described below in Table 1:

TABLE 1

Exemplary Usage Attributes

| Attribute | Meaning |
|---|---|
| Required | The assertion must be applied to the subject. If the subject does not meet the criteria expressed in the assertion a fault or error will occur. |
| Rejected | The assertion is explicitly not supported and if present will cause failure. |
| Optional | The assertion may be made of the subject but it is not required to be applied. |
| Observed | The assertion will be applied to all subjects and requesters of the service are informed that the policy will be applied. |
| Ignored | The assertion is processed, but ignored. That is, it can be specified, but no action will be taken as a result of it being specified. Subjects and requesters are informed that the policy will be ignored. |

With regard to Table 1, a policy subject is a node to which a policy can be bound. Other exemplary operators and containers, in addition to the "All" operator and the "ExactlyOne" operator, are shown and described below in Table 2:

TABLE 2

Exemplary Assertion Operators/Containers

| Operator/Container | Meaning |
|---|---|
| Policy | A policy expression that is the top level container for the set of policy operators and assertions. |
| ExactlyOne | An ExactlyOne operator may contain one or more policy assertions, references, or operators. The ExactlyOne operator requires that exactly one of the bounded operands be satisfied. |
| All | The All operator may contain one or more policy assertions, references, or operators. The All operator requires that every one of the bounded operands be satisfied. |
| OneOrMore | The OneOrMore operator may contain one or more policy assertions, references, or operators. The OneOrMore operator requires that at least one of the bounded operands be satisfied. |

The exemplary attributes, operators, and containers described in Table 1 and Table 2 are in no way intended to limit a particular policy implementation to the attributes, operators, and containers shown. Those skilled in the art may readily recognize and develop other attributes, operators, and containers that are useful in a particular implementation, which are within the scope of the present application.

Some examples of assertions that may be made related to protocols are Simple Object Access Protocol (SOAP) 1.1, SOAP 1.0, HyperText Transport Protocol (HTTP) 1.1, HTTP over Secure Sockets Layer (SSL) (HTTPS), Pipelined HTTP (PHTTP), TCP/IP, FTP, just to name a few.

While an assertion often expresses one particular capability (e.g., encoding a message in UTF-8), assertions are not limited to expressing only one specific capability. Assertions that specify more than one capability or requirement are referred to as aggregate assertions. An aggregate assertion captures what would otherwise be stated as a set of specific assertions, potentially with preference and choice. For example, a service advertising the WS-I BP 1.0 aggregate assertion could accept messages sent over HTTP or HTTPS, and authenticated with username/password or a client X509 certificate. This is equivalent to a policy containing separate assertions for each of these capabilities.

Groups that exchange messages can define aggregate policy assertions that are shorthand for sets of assertions the groups commonly use. The implementer of the code to process these aggregate assertions may either explicitly expand the shorthand into the more specific assertions, or write code that implements all requirements and capabilities of the aggregate assertion directly. A policy can contain either one aggregate assertion or a plurality of assertions, where the assertions can be either specific assertions or aggregate assertions.

It will be appreciated that by using a policy, such as policy 200, a node can specify capabilities, requirements, the number of messages and their form, security measures, reliable messaging, transactions, routing, and other parameters relevant to a message exchange. In addition, policies are extensible, whereby a policy can be extended to include, for example, newly available policy expressions.

Policies are composable, which means that policy expressions having one or more assertions can be inserted into or removed from a policy. Thus, for example, the SOAP header model and Web Services Specifications (WS-specs) outline a composable model, thereby making SOAP headers and WS-specs suitable technologies for implementing a policy scheme outlined herein. In addition, the policy schemes described herein enable nodes to specify a flexible set of protocols at runtime using elements from web services, such as those described by WS-specs.

Exemplary Operations

Described herein are exemplary methods for implementing dynamic protocol instruction in a network environment. The methods described herein may be embodied as logic instructions on one or more computer-readable medium. When executed on a processor, the logic instructions cause a general purpose computing device to be programmed as a special-purpose machine that implements the described methods. In the following exemplary operations, the components and connections depicted in the figures may be used to implement dynamic protocol construction in a network environment.

Figure 3:
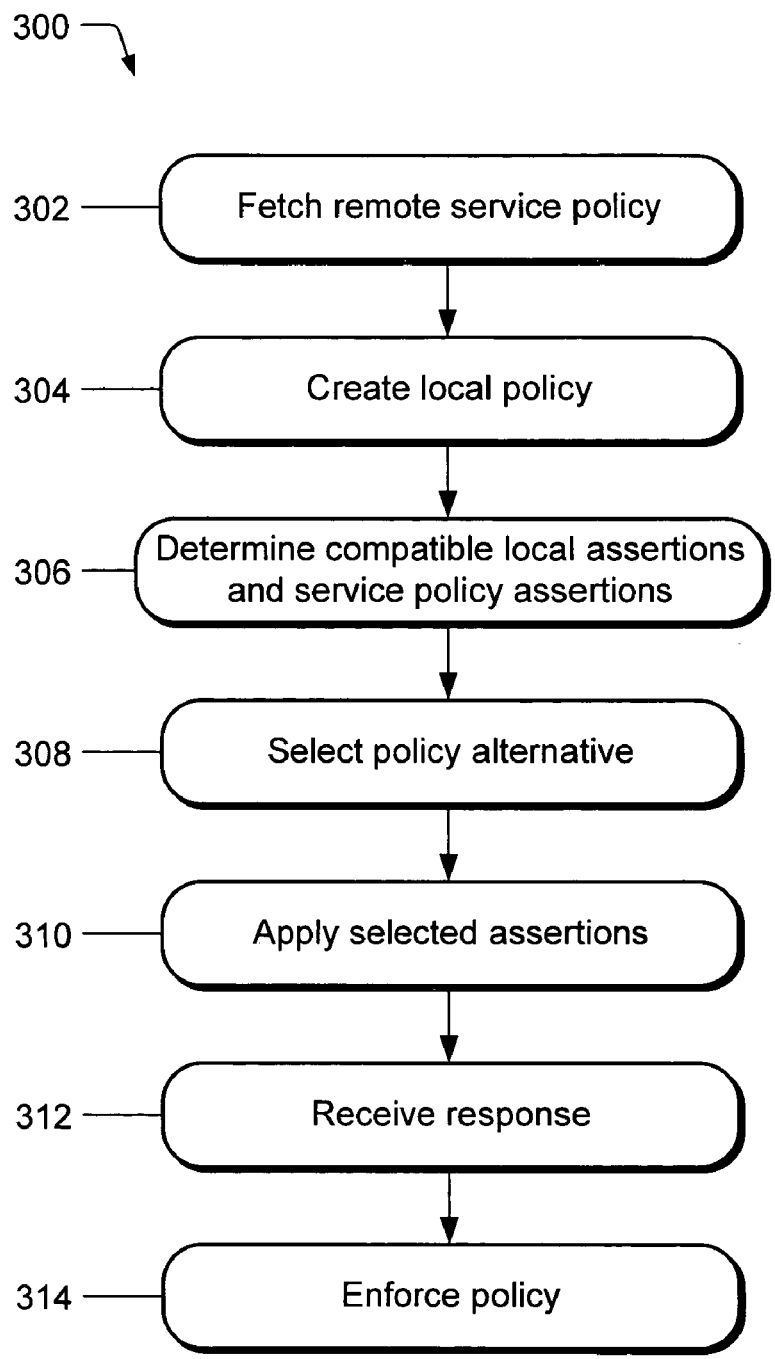
FIGS. 3–4 are flowcharts illustrating exemplary operations to implement dynamic protocol construction.

FIG. 3 illustrates a dynamic protocol construction operation flow or algorithm 300 that would be performed by a source node that initiates a message exchange with a destination node. For example, a client accessing a server may execute the operations shown in the operation flow 300. As another example, a first peer attempting to contact a second peer in a peer-to-peer environment may execute the operations shown in FIG. 3 to establish a protocol for communication.

The exemplary operations shown and discussed with respect to the dynamic protocol construction operation flow 300 are with respect to a client/server environment, but it is to be understood that the operation flow 300 is generally applicable to any computing device that is initiating a message exchange. In the following description of the operation flow 300, a local policy refers to a policy related to the client and a remote service policy refers to a policy related to a service executing at the server.

In a fetching operation 302, the client fetches the remote service policy characterizing capabilities and/or requirements of the server. The fetching operation 302 generally involves retrieving the remote service policy and may include caching the retrieved service policy at the client for later use. In one implementation of the fetching operation 302, the client sends a request to the server requesting the remote service policy. The client may receive in response an input service policy or an output service policy, or both.

Another implementation of the fetching operation 302 receives the policy or policies incrementally from the server. For example, the client may receive a first set of assertions from the server, followed by a second set, and so on. The client may receive logically related groups of the policy assertions incrementally.

In yet another implementation of the fetching operation 302 the client does not fetch the remote service policy from the server related to the remote service policy, but rather the client receives the remote service policy from an advertising server. In this implementation, the remote server advertises the remote server policy on the advertising server, from which the client can access the remote service policy. The client may receive the remote service policy incrementally or all at once.

In yet another implementation of the fetching operation 302, the client checks a cache memory on the client for a cached copy of the remote service policy. If the client finds the remote service policy in the client cache, the client may or may not request the remote service policy from the remote server. In this implementation, the client may check the age of the cached remote service policy (e.g. by comparing a date on the cached remote service policy to a predetermined date) and if the age is greater than a target date, the client may request a new remote service policy from the remote server.

The act of fetching policy may itself be subject to protocol construction. This may involve an initial "bootstrap" protocol, which is agreed to by endpoints based on out of band mechanisms. All implementers that wish to fetch policy will need to agree to use some common protocol or protocols to exchange policy documents. This is the "fetch policy" policy. For example, they may agree to the "fetch policy" policy defined in a paper specification, email each other the "fetch policy" policy for each service, post the "fetch policy" policy on a website for downloading, or advertise the "fetch policy" policy as part of the mechanism used to advertise the service itself. As an example of the later, when a service is advertised in a universal description, discovery, and integration (UDDI) repository, the "fetch policy" policy for the service could be stored with the service address and other capabilities.

A creating operation 304 creates a local (i.e., client) policy. As discussed above, the local policy can include a number of assertions related to input and output capabilities and requirements of the client. As such, one implementation of the creating operation 304 creates one or more policies based on local hardware and software capabilities, and configuration decisions made by the client implementer and administrator deploying the client. The creating operation 304 preferably creates a local input policy and a local output policy related to the client.

A determining operation 306 determines whether the remote service policy includes at least one set of assertions that are compatible with client capabilities. In one implementation of the determining operation 306, the client identifies one or more groups of assertions in the remote input service policy that intersect with the local (i.e., client) output policy. An intersection between two policies occurs when a group of assertions in the remote input service policy matches or is a subset of a group of assertions in the local output policy.

A selecting operation 308 selects one group of assertions from the groups of assertions identified in the determining operation 306, if more than one group of compatible assertions was identified. The selecting operation 308 can consider "preference" values in either the local policy or the remote service policy, or both, to determine if one group of assertions is preferred over another group, and select the preferred group.

An implementation of the selecting operation 308 includes configuring software to enable the software to send and receive messages that conform to the selected policy. Configuring the software may involve calling various software modules and/or accessing data stores to obtain security tokens or other data related to the selected policy. The implementation-specific details related to implementing a particular assertion are defined by the specification for the assertion.

An applying operation 310 applies the selected assertions from the selecting operation 308. In one implementation, the applying operation 310 sends a request message to the server. The request message includes an underlying message that the client is sending to the server. For example, if the client is attempting to order books from the server, the request message is a book order message, having service-recognizable syntax and semantics corresponding to a book order.

The applying operation 310 appends a header having the selected remote service input policy assertions and the local input policy assertions to the underlying message. By appending the remote service input policy assertions, the client conveys to the remote server the protocols and data formats or other properties that will be used by the client to communicate with the server. By appending the local input policy assertions to the underlying message, the client conveys to the server the properties of the client by which the server can communicate with the client.

A receiving operation 312 receives a response from the server. The response from the server is a combination of the underlying response to the client's previous underlying request message and a selected group of assertions from the local input policy. The client is thereby notified about which of the client's communication properties the server will be using to communicate with the client.

An enforcing operation 314 enforces the policy selected by the server. An implementation of the enforcing operation 314 ensures that messages received from the server conform to the input assertions that the server selected previously. Thus, for example, if one of the selected input assertions requires a particular type of encryption, the client will check to see that messages received from the server are encrypted accordingly.

Figure 4:
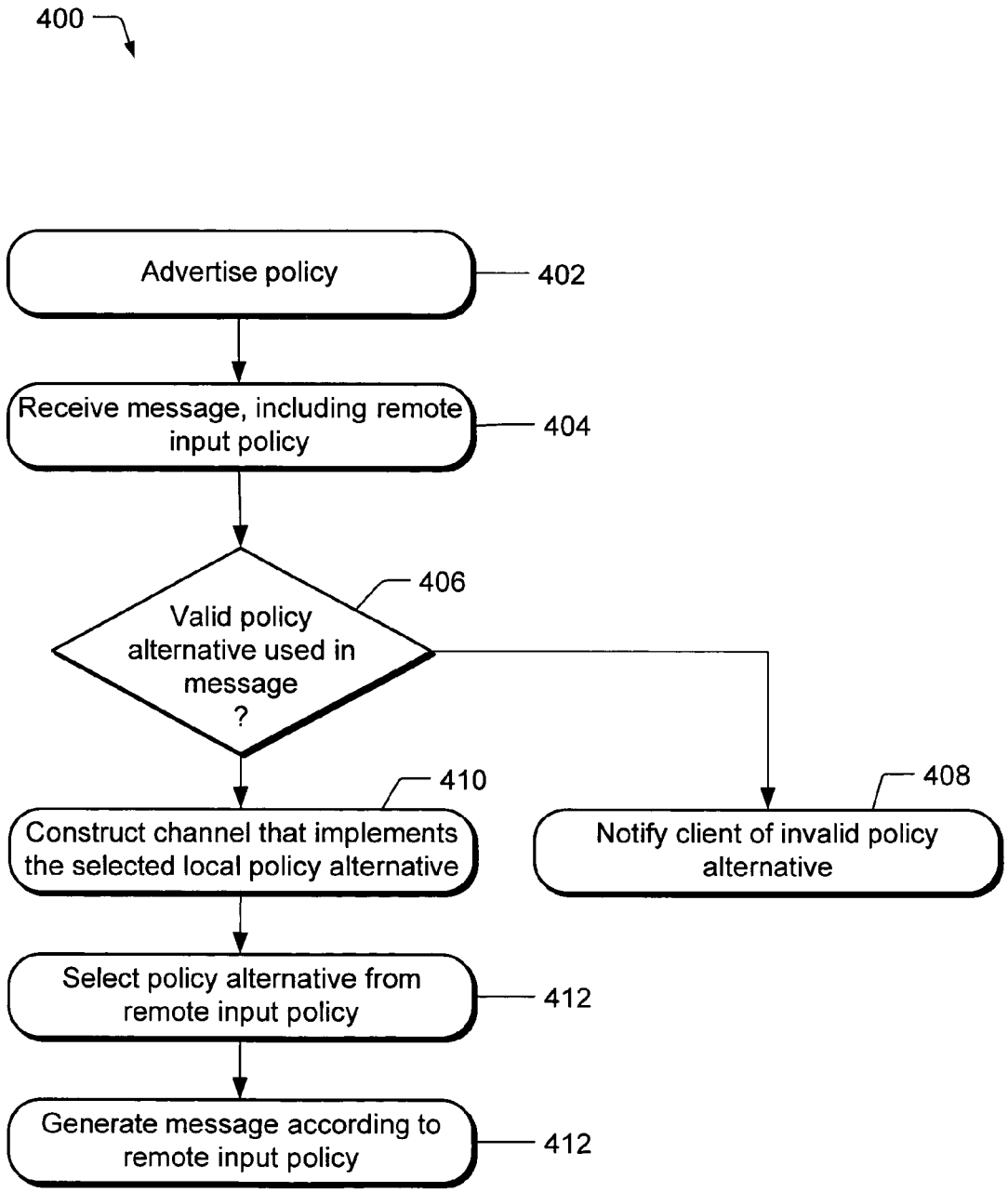

FIG. 4 illustrates another dynamic protocol construction operation flow or algorithm 400, which is applicable to a server in a client/server environment. As with the operation flow 300 discussed above, the dynamic protocol construction operation flow 400 of FIG. 4 is not limited to a client/server environment. Rather, the dynamic protocol construction operation flow 400 is applicable to any environment in which a node is the recipient of a request to enter into a message exchange.

The dynamic protocol construction operation flow 400 is described from the perspective of the server. As such, the local policy is the policy related to a service executing at the server and the remote policy is the policy related to the client.

An advertising operation 402 advertises the local policy of the server. Advertising the local policy involves making the local policy known to at least one other node, and in this particular case, the client. One implementation of the advertising operation generates the local policy and transmits all of the local policy to the client in response to a client request for the local policy.

Another implementation of the advertising operation 402 generates the local policy and incrementally transmits the local policy to the client. In this implementation, the server may receive a request from the client for each incremental portion of the local policy, and responsively transmit the requested portion.

Yet another implementation of the advertising operation 402 generates the local policy and stores the local policy on an advertising server, from which the client can retrieve the local policy.

In yet another implementation of the advertising operation 402, a copy of the local policy is delivered to a third party service that reads the local policy and the client policy to determine if the two policies are compatible.

A receiving operation 404 receives a message from the client. The message includes an underlying message and a header indicating a group of assertions from the local policy that the client will be using to communicate with the server. The header also provides a remote input policy indicating the client's capabilities and requirements related to receiving messages.

A determining operation 406 determines whether the message received in the receiving operation 404 used a valid policy expression. The determining operation 406 checks that the message conforms to the selected group of assertions in the local policy. Thus, for example, the determining operation 406 may determine whether the message was encrypted according to an encryption format specified in the local policy. If the message does not conform to the selected group of assertions, then the operation 400 branches "NO" to a notifying operation 408, in which the client is notified that the message does not conform to a valid policy expression.

If, on the other hand, the determining operation 406 does determine that a valid policy expression was applied to the message, the operation 400 branches "YES" to a constructing operation 410. The constructing operation 410 constructs a receive channel that implements the selected policy expression.

A selecting operation 412 selects a policy expression from the remote client's input policy. As indicated above, the selection of a policy expression can be based on the service's capabilities or preferences specified in the input policy and other factors. After the selecting operation 412 selects a policy expression, a generating operation 414 generates a reply message to the client based on the selected policy expression. The reply message typically includes an underlying response message and an indication of the client input policy expression that the service selected for communication with the client.

Exemplary Computing Device

Figure 5:
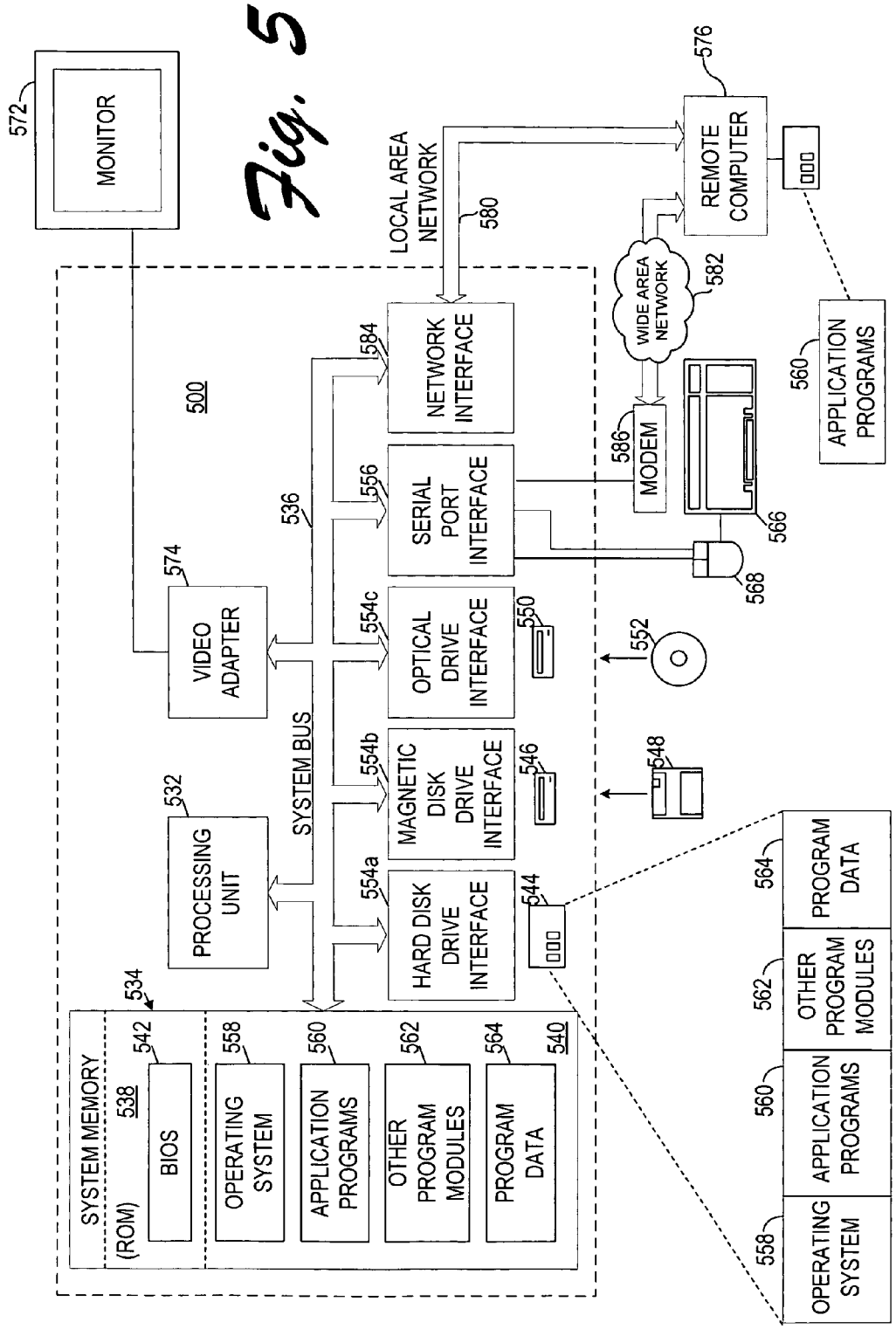
FIG. 5 is a schematic illustration of an exemplary computing device that can be utilized to implement dynamic protocol construction.

FIG. 5 is a schematic illustration of an exemplary computing device 500 that can be utilized to implement a host. Computing device 500 includes one or more processors or processing units 532, a system memory 534, and a bus 536 that couples various system components including the system memory 534 to processors 532. The bus 536 represents one or more of any of several types of bus structures, including a memory bus or memory controller, a peripheral bus, an accelerated graphics port, and a processor or local bus using any of a variety of bus architectures. The system memory 534 includes read only memory (ROM) 538 and random access memory (RAM) 540. A basic input/output system (BIOS) 542, containing the basic routines that help to transfer information between elements within computing device 500, such as during start-up, is stored in ROM 538.

Computing device 500 further includes a hard disk drive 544 for reading from and writing to a hard disk (not shown), and may include a magnetic disk drive 546 for reading from and writing to a removable magnetic disk 548, and an optical disk drive 550 for reading from or writing to a removable optical disk 552 such as a CD ROM or other optical media. The hard disk drive 544, magnetic disk drive 546, and optical disk drive 550 are connected to the bus 536 by appropriate interfaces 554a, 554b, and 554c. The drives and their associated computer-readable media provide nonvolatile storage of computer-readable instructions, data structures, program modules and other data for computing device 500. Although the exemplary environment described herein employs a hard disk, a removable magnetic disk 548 and a removable optical disk 552, other types of computer-readable media such as magnetic cassettes, flash memory cards, digital video disks, random access memories (RAMs), read only memories (ROMs), and the like, may also be used in the exemplary operating environment.

A number of program modules may be stored on the hard disk 544, magnetic disk 548, optical disk 552, ROM 538, or RAM 540, including an operating system 558, one or more application programs 560, other program modules 562, and program data 564. A user may enter commands and information into computing device 500 through input devices such as a keyboard 566 and a pointing device 568. Other input devices (not shown) may include a microphone, joystick, game pad, satellite dish, scanner, or the like. These and other input devices are connected to the processing unit 532 through an interface 556 that is coupled to the bus 536. A monitor 572 or other type of display device is also connected to the bus 536 via an interface, such as a video adapter 574.

Generally, the data processors of computing device 500 are programmed by means of instructions stored at different times in the various computer-readable storage media of the computer. Programs and operating systems may be distributed, for example, on floppy disks, CD-ROMs, or electronically, and are installed or loaded into the secondary memory of the computing device 500. At execution, the programs are loaded at least partially into the computing device's 500 primary electronic memory.

Computing device 500 may operate in a networked environment using logical connections to one or more remote computers, such as a remote computer 576. The remote computer 576 may be a personal computer, a server, a router, a network PC, a peer device or other common network node, and typically includes many or all of the elements described above relative to computing device 500. The logical connections depicted in FIG. 5 include a LAN 580 and a WAN 582. The logical connections may be wired, wireless, or any combination thereof.

The WAN 582 can include a number of networks and subnetworks through which data can be routed from the computing device 500 and the remote computer 576, and vice versa. The WAN 582 can include any number of nodes (e.g., DNS servers, routers, etc.) by which messages are directed to the proper destination node.

When used in a LAN networking environment, computing device 500 is connected to the local network 580 through a network interface or adapter 584. When used in a WAN networking environment, computing device 500 typically includes a modem 586 or other means for establishing communications over the wide area network 582, such as the Internet. The modem 586, which may be internal or external, is connected to the bus 536 via a serial port interface 556.

In a networked environment, program modules depicted relative to the computing device 500, or portions thereof, may be stored in the remote memory storage device. It will be appreciated that the network connections shown are exemplary and other means of establishing a communications link between the computers may be used.

The computing device 500 may be implemented as a server computer that is dedicated to server applications or that also runs other applications. Alternatively, the computing device 500 may be embodied in, by way of illustration, a stand-alone personal desktop or laptop computer (PCs), workstation, personal digital assistant (PDA), or electronic appliance, to name only a few.

Various modules and techniques may be described herein in the general context of computer-executable instructions, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

An implementation of these modules and techniques may be stored on or transmitted across some form of computer-readable media. Computer-readable media can be any available media that can be accessed by a computer. By way of example, and not limitation, computer-readable media may comprise "computer storage media" and "communications media."

"Computer storage media" includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer-readable instructions, data structures, program modules, or other data in a modulated data signal, such as carrier wave or other transport mechanism. Communication media also includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer-readable media.

In addition to the specific implementations explicitly set forth herein, other aspects and implementations will be apparent to those skilled in the art from consideration of the specification disclosed herein. It is intended that the specification and illustrated implementations be considered as examples only, with a true scope and spirit of the following claims.

What is claimed is:

1. A method comprising:
    advertising a policy having one or more of assertions characterizing communication properties of a destination node, each assertion specifying a communication property supported by the destination node and selectable by a source node to construct a communication protocol for communication with the destination node;
    grouping two or more of the one or more assertions into a policy expression in the policy;
    specifying a relationship between the two or more assertions.

2. A method as recited in claim 1 wherein the advertising comprises generating a message including the policy.

3. A method as recited in claim 1, wherein the advertising comprises incrementally distributing the policy.

4. A method as recited in claim 1, wherein the advertising comprises generating a message including the policy in response to a request for the policy.

5. A method as recited in claim 1, further comprising determining whether a received message conforms to at least one of the plurality of assertions.

6. A method comprising:
    advertising a policy having one or more of assertions characterizing communication properties of a destination node, each assertion specifying a communication property supported by the destination node and selectable by a source node to construct a communication protocol for communication with the destination node;
    specifying a preference for at least one of the plurality of assertions over at least one other of the plurality of assertions in the policy.

7. A method as recited in claim 6 wherein the advertising comprises generating a message including the policy.

8. A method as recited in claim 6, wherein the advertising comprises incrementally distributing the policy.

9. A method as recited in claim 6, wherein the advertising comprises generating a message including the policy in response to a request for the policy.

10. A method as recited in claim 6, further comprising determining whether a received message conforms to at least one of the plurality of assertions.

11. A method comprising:
    advertising a policy having one or more of assertions characterizing communication properties of a destination node, each assertion specifying a communication property supported by the destination node and selectable by a source node to construct a communication protocol for communication with the destination node;
    grouping two or more of the plurality of assertions into a first policy expression;

specifying a first relationship between the two or more assertions in the first policy expression;

specifying a second relationship between the first policy expression and at least one other assertion not in the first policy expression.

12. A method as recited in claim 11, wherein the advertising comprises generating a message including the policy.

13. A method as recited in claim 11, wherein the advertising comprises incrementally distributing the policy.

14. A method as recited in claim 11, wherein the advertising comprises generating a message including the policy in response to a request for the policy.

15. A method as recited in claim 11, further comprising determining whether a received message conforms to at least one of the plurality of assertions.

16. A method comprising:

advertising a policy having one or more of assertions characterizing communication properties of a destination node, each assertion specifying a communication property supported by the destination node and selectable by a source node to construct a communication protocol for communication with the destination node;

generating an input policy having a plurality of assertions characterizing input communication properties of the destination node and an output policy having a plurality of assertions characterizing output communication properties of the destination node.

17. A method as recited in claim 16, wherein the advertising comprises generating a message including the policy.

18. A method as recited in claim 16, wherein the advertising comprises incrementally distributing the policy.

19. A method as recited in claim 16, wherein the advertising comprises generating a message including the policy in response to a request for the policy.

20. A method as recited in claim 16, further comprising determining whether a received message conforms to at least one of the plurality of assertions.

* * * * *